United States Patent
Karlsson et al.

(10) Patent No.: US 6,591,805 B1
(45) Date of Patent: Jul. 15, 2003

(54) PORT SYSTEM, ESPECIALLY AN INDUCTION MANIFOLD FOR AN INTERNAL COMBUSTION ENGINE

(75) Inventors: Jan Karlsson, Vastra Frolunda (SE); Arthur Klotz, Remseck (DE); Rudolf Leipelt, Hessigheim (DE); Stefan Maier, Besigheim (DE); Holger Paffrath, Pulheim (DE); Robert Vaculik, Marbach (DE)

(73) Assignees: Volvo Car Corporation AB, Goeteborg (SE); Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/762,059
(22) PCT Filed: Aug. 2, 1999
(86) PCT No.: PCT/EP99/05560
  § 371 (c)(1),
  (2), (4) Date: Sep. 7, 2001
(87) PCT Pub. No.: WO00/08321
  PCT Pub. Date: Feb. 17, 2000

(30) Foreign Application Priority Data

Aug. 1, 1998 (DE) .......................................... 198 34 835

(51) Int. Cl.$^7$ ................................................ F02M 35/10
(52) U.S. Cl. ..................................................... 123/184.56
(58) Field of Search ......................... 123/184.56, 184.53

(56) References Cited

U.S. PATENT DOCUMENTS 4,483,288 A * 11/1984 Ueno et al. ............... 123/198 F

* cited by examiner

Primary Examiner—Tony M. Argenbright
Assistant Examiner—Katrina B. Harris
(74) Attorney, Agent, or Firm—Crowell & Moring LLP

(57) ABSTRACT

A duct system, especially an intake manifold for an internal combustion engine, having flap valves (13) for selective opening and closing of at least some of the ducts. The valves should be continuously adjustable in position in order to produce a swirl in the combustion airflow. To achieve this a high degree of angular precision is required in the positioning of the valves. Intake manifold manufacturing tolerances need to be compensated during assembly of the valves. Valve adjusting mechanisms are provided on the axles of the valves or in the mechanical connections of the valve gear pertaining to the valve drive mechanism.

11 Claims, 2 Drawing Sheets

PORT SYSTEM, ESPECIALLY AN INDUCTION MANIFOLD FOR AN INTERNAL COMBUSTION ENGINE

BACKGROUND OF THE INVENTION

The invention relates to a duct system, especially for use as an intake manifold for an internal combustion engine, which has flap valves in the individual intake passages leading to the cylinders. Moreover, the invention relates to a method for the manufacture of the above-mentioned intake manifold.

An arrangement of flap valves in the individual intake passages of an intake manifold is disclosed for example in DE 38 43 509. Each of the cylinders has two separate intake passages for the combustion air. With the flap valves it is possible to close one of the intake passages to the cylinders, so that when the motor is in the partial-load range, the effective air intake cross section for the cylinders can be reduced. The actuation of the flap valves can be performed through a push rod which is operated by a flap valve drive means. The flap valves move against a mechanical stop. Thus the flap valve can only be in the open or closed position. The elasticity of the push rod is deliberately utilized to compensate for production tolerances by deforming when the flap valves are in the abutted position.

It is a disadvantage of the known system that the flap valves can assume only two working positions. However, continuous adjustability of the flap valves with defined flap valve positions would be desirable. For a continuous variation of the flap valves, the equalization of tolerances by the resilient push rod must be omitted. This would be possible only if the intake manifold were manufactured with very small tolerances.

This is not possible, however, due to economic considerations.

SUMMARY OF THE INVENTION

The object of the invention is to provide an intake tube with a continuously variable flap valve which can compete in economics of production with the known flap valve manufacturing methods. This object is achieved by the features of the invention as described and claimed hereinafter.

Advantages of the Invention

The intake manifold according to the invention has flap valves which are disposed in the intake passages of the intake manifold between the intake plenum and the outlet on the cylinder side. The flap valves are operated by gears or toothed sectors. A drive means applies the operating force, for example via a rack, through the control to the flap valves. The drive means must assure the possibility of a continuous operation of the flap valves. The mechanical couplings between the operating rods, the flap valves and the drive means must be constructed without free play. Only in this way can a precisely defined flap valve position be achieved. In order for all of the flap valves to always have the same position relative to each other, any manufacturing tolerances in the intake manifold and in the flap valve system must be compensated. For this purpose an adjustment is provided which can be integrated into the teeth between the rack and the gear wheel or into the flap valve shaft. The adjustment must be designed so that the position of each individual flap valve can be adjusted and then fixed.

If the flap valves are disposed in the vicinity of the cylinder inlets, the precisely defined flap valve position can be utilized to generate a swirling flow in the combustion chamber of the cylinders. This has the advantage of better mixing in the partial-load range of the motor, so that fuel consumption and pollutant emission can be reduced. The continuous adjustability furthermore makes it possible to provide flap valves in all of the intake passages leading to the cylinders. In that case, of course, not all of the flap valves can be closed, since in this case the air supply would be completely cut off.

A practical embodiment of the invention provides the tolerance compensating device on the rack or worm. It then is comprised of a drive rod which is connected to the drive means and is provided with teeth or a sleeve bearing a worm for each flap valve, it being possible for the sleeves to shift freely and to be locked in place on the drive rod. The adjustment can be performed on the gears and toothed sectors precisely in this manner if they are manufactured as base bodies with attached teeth. The integration of the adjustments on these components has the advantage that the connections are easily accessible during assembly. Also, readjustments can easily be carried out in this manner during maintenance operations by releasing the connections on the adjusters.

However, advantages are also to be found if the adjusters are permanently fixed adhesive connections. The adhesive can then be applied during the assembly process and thereafter the entire flap valve control unit assembled. Manufacturing tolerances are thus automatically compensated since the adhesive is not yet cured. After the adhesive connection has cured, the flap valves have become fixed in their defined relation to one another.

In another variant of the invention the adjustment is provided in the mechanical coupling between the flap valve axle and the gear wheels acting as drive means. The flap valve crank can be inserted into a bore in the axis of the flap valve, for example. The bonding of the two components to one another can be accomplished by adhesive bonding. The joint can be made advantageously elastic. Since when the flap valves are in positions between the abutments only low forces act between the flap valves, a definite position within the adjustment range of the flap valves is assured despite the elasticity of the adhesive joint. However, when the flap valves are positioned against the stops, the elasticity of the adhesive joint permits an additional compensation of tolerances. This method thus combines the advantageous principles of the operation of known systems with those of the invention.

In one particular embodiment, the flap valves that are used are assembly-injection molded flap valve modules which can be attached to the intake pipe. This measure increases the economy of the invention.

In order to manufacture the intake manifold of the invention, a method is proposed which permits an efficient adjustment of the flap valves during assembly. This is achieved by the use of a jig which brings the flap valves into the desired position relative to one another and relative to the drive means. After the pre-assembly of the operating linkage and drive means the adjustments can be locked up. Thus the flap valves become invariable in their position with respect to one another. Any manufacturing tolerances are automatically compensated. At the end of the assembly operation the jig is removed again.

These and additional features of preferred embodiments of the invention will be found not only in the claims but also in the description and the drawings, the individual features being applicable individually or jointly in the form of subcombinations in the embodiment of the invention and in other fields and may represent advantageous as well as independently patentable embodiments, for which protection is hereby claimed.

BRIEF DESCRIPTION OF THE DRAWINGS

DRAWING

Figure 1:
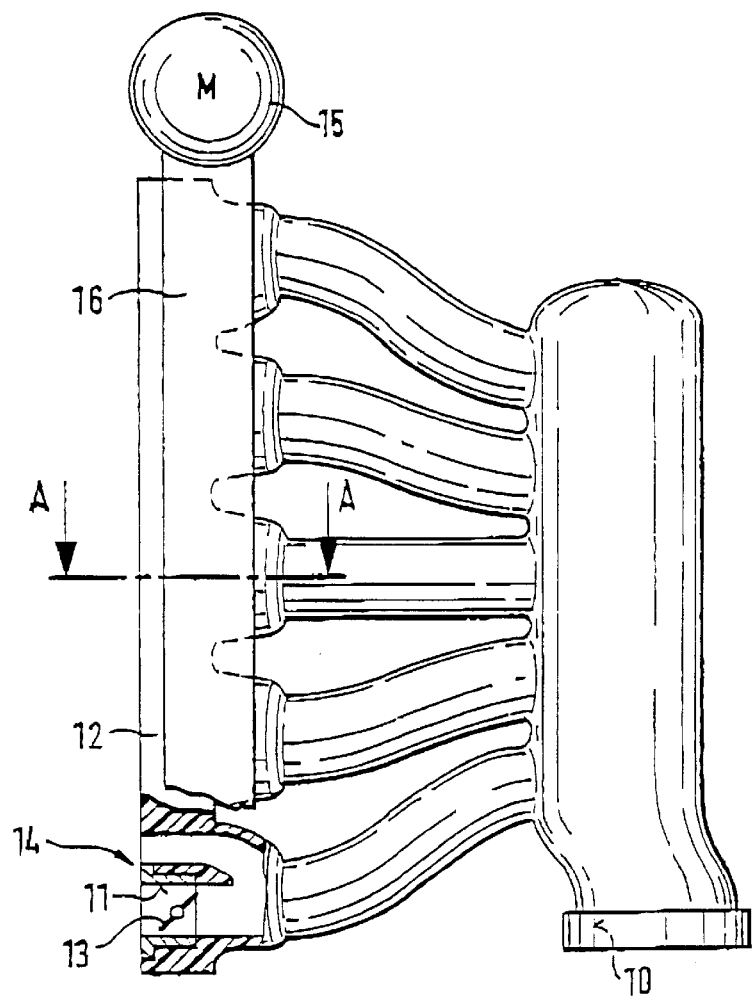

Further details are described in the drawings with reference to schematic working embodiments.

FIG. 1 shows a schematic representation of an intake manifold for a five-cylinder internal combustion engine with the control linkage according to the invention, contained in a control box, in a top plan view.

Figure 2:
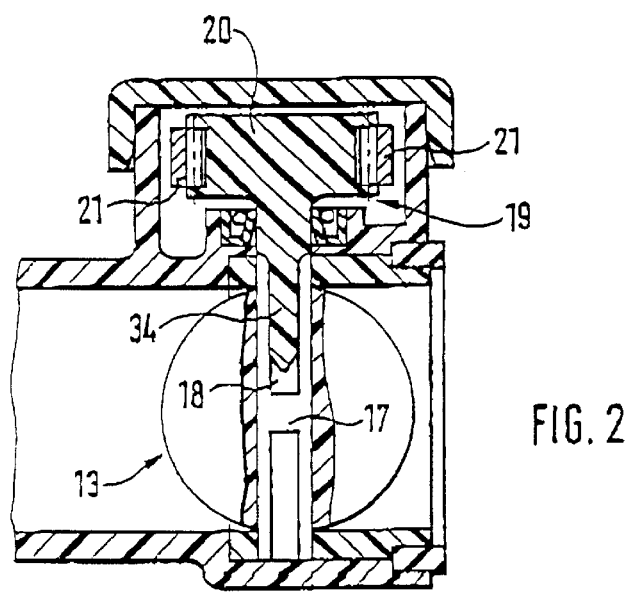
Figure 2:
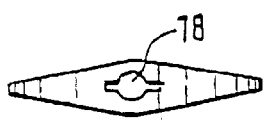

FIG. 2 shows a longitudinal section taken through an intake manifold with an assembly injection-molded flap valve, wherein the adjustment is realized in the form of an adhesively bonded joint between the flap valve shaft and the control gear.

Figure 3:
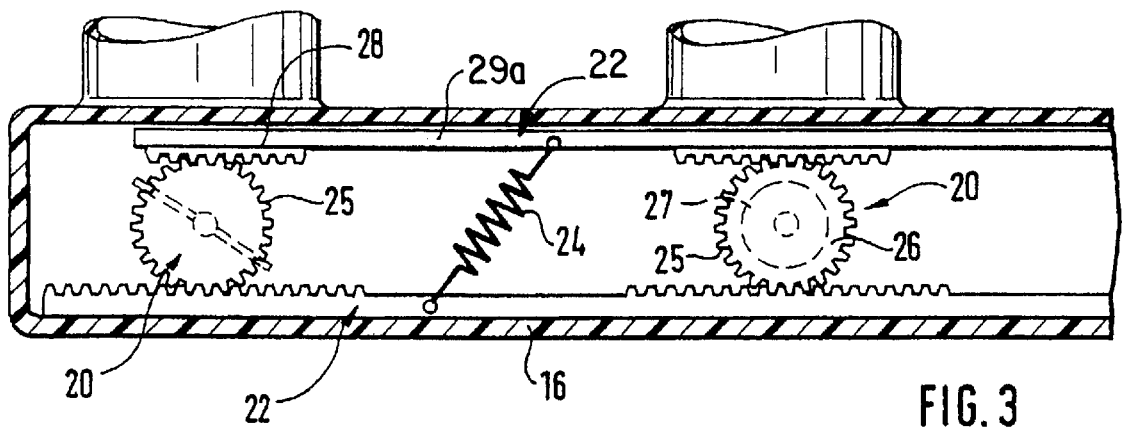

FIG. 3 shows an elevation of the arrangement of the control mechanism in a control box, which is formed by gear wheels connected to the flap valve shafts and by two racks.

Figure 4:
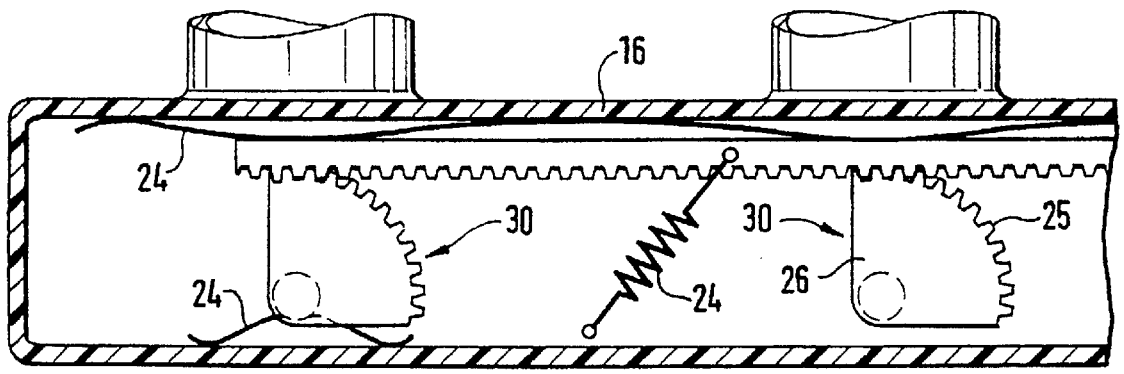

FIG. 4 shows an elevation of a control mechanism in a control box, the mechanism being formed by toothed sectors on the flap valve shafts, which are operated by a rack.

Figure 5:
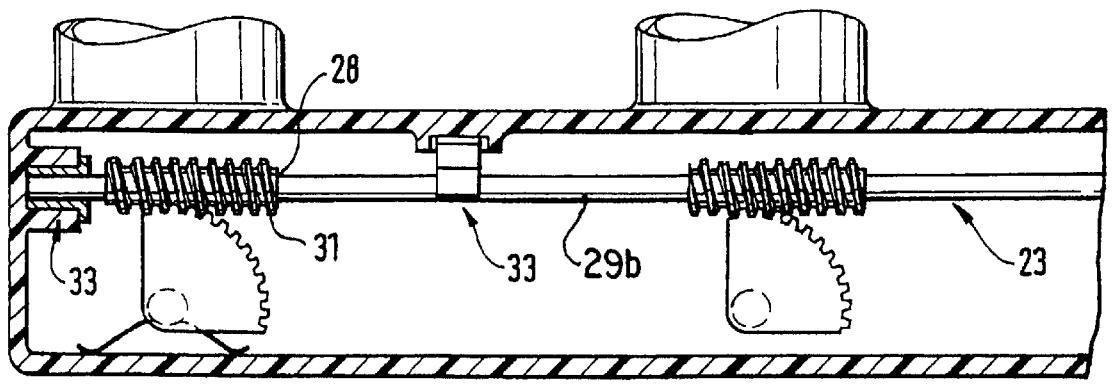

FIG. 5 shows the arrangement of the control mechanism in a control box, in which the mechanism is formed by toothed sectors attached to flap valve shafts and a control rod configured as a worm shaft.

DETAILED DESCRIPTION OF PREFERRED EMBODIMENTS

DESCRIPTION OF THE WORKING EMBODIMENTS

An intake manifold is illustrated schematically in FIG. 1 and a continuous flap valve adjuster is provided on it. The intake manifold has an inlet 10 and outlets 11 on the cylinder side, the outlets 11 being contained in a cylinder head flange 12. In every second outlet 11 a flap valve 13 is contained, which is part of an assembly-injection-molded flap valve module 14 installed in the cylinder heat flange 12. Each cylinder thus has an inlet which is provided with a continuously adjustable flap valve. The delivery of air in the inlet can be controlled continuously by the control mechanism. The control mechanism has a drive means 15 and is contained in a housing 16 which is fastened on the cylinder head flange 12. The control mechanism is in communication with the flap valves 13 through openings in the housing bottom.

FIG. 2 shows a section through the outlet 11 of an intake manifold. The assembly-injection-molded flap valve 13 is installed in the opening of the outlet. A flap valve shaft 17 has a receiver hole 18 of elongated cross section. The receiver hole is mechanically connected to an actuator 19 of the flap valve, the actuator being formed by a gear 20. The gear can be inserted with the stem 34 into the receiver hole 18. Space is provided between the stem and the receiver hole 18, so that the adjustment of flap valve 13 can still take place. The space between receiver hole 18 and stem 34 is filled with an elastic composition, especially silicone. After this composition cures, the adjusted flap valve is locked up. The driving force is applied to the gear 20 through force transmitting means 21.

The force transmitting means 21 can be realized in the form of racks 22 or by a worm shaft 23.

In FIG. 3 there is shown a flap valve drive means which operated with two racks 22. These are engaged with gear wheels 20 which are connected to the flap valves. The control unit for the flap valves is contained in the box-like housing 16. In this housing tensioning means 24 are provided which prevent any slippage of the racks 22 on the gears 40. As an alternative to the adhesive bonding method of locking the valve shaft, the adjustment 27 also can be established by a shaft-to-hub lock between teeth 25 and a base body 26 of the gear wheel 20. When assembly is performed, the flap valves can be adjusted by an angular shift between base body 26 and teeth 25. After assembly this setting must be fixed in position. This can be done, for example, by an adhesive bond 28.

An additional variant of the adjustment 27 on the upper rack 22 is also depicted in FIG. 3. This one is equipped with freely displaceable and lockable teeth 25. The adjustment of the flap valves during the assembly process is performed in a manner analogous to the adjustment with the aid of gears 20, for example by providing an adhesive bond 28 between teeth 25 and a drive rack 29a, in which case the adjustment of the flap valves must be made during the time the adhesive is curing.

FIG. 4 shows a variant of the control mechanism with controls in the form of toothed sectors 30. It is shown by way of example that the gear sectors can consist of teeth 25 and a base body 26 in order to provide for adjustment. As an alternative to coil springs as the tensioning means 24, sinuously curved leaf springs can be used, which can be supported, for example, against the wall of the control box 16.

In FIG. 5 there is shown a variant in which the transmission of force is provided by the worm shaft 23. Worms 31 can be mounted on the drive shaft 29b by the adhesive bond 28, for example. The adhesive bond is especially suitable for integrating the setting for the adjustment of the flap valves. The drive shaft is mounted in bearings 33.

What is claimed is:

1. A duct system for use as an intake manifold for an internal combustion engine, comprising at least one inlet, at least two intake passages having outlets, at least one of said passages having a pivotably mounted flap valve installed therein, a valve driver which produces a switching force, a force transmitting mechanism which couples the flap valves together mechanically and which transmits the switching force from the valve driver to an actuator associated with each flap valve to turn the flap valve such that the flap valve is continuously adjustable to any position between fully open and fully closed, wherein the actuators comprise gear wheels or gear sectors which are fixedly attached to the flap valves, the force transmitting mechanism comprises at least one rack or worm shaft, and a position adjusting mechanism is provided between the force transmitting mechanism and at least two flap valves.

2. A duct system according to claim 1, wherein the rack or worm shaft comprises a drive rod and meshing teeth or worms, respectively, and the adjusting mechanism is comprised of an axially displaceable and fixable connection between the drive rod and the meshing teeth or worms.

3. A duct system according to claim 2, wherein the displaceable and fixable connection is a permanently fixable adhesive joint.

4. A duct system according to claim 1, wherein the actuators are gear wheels each comprised of toothed ring and a base body, and the adjusting mechanism is comprised of a radially rotatable and fixable connection between the toothed ring and the base body.

5. A duct system according to claim 4, wherein the rotatable and fixable connection is a permanently fixable adhesive joint.

6. A duct system according to claim 1, wherein the adjusting mechanism is constructed in a mechanical coupling between a valve shaft and the actuator.

7. A duct system according to claim 6, wherein the adjusting mechanism is fixed in position by an adhesive bond between the valve shaft and the actuator.

8. A duct system according to claim 7, wherein the adhesive bond is formed by an elastic adhesive.

9. A duct system according to claim 8, wherein said adhesive is an elastic silicone elastomer.

10. A duct system according to claim 1, wherein the flap valves comprise assembly-injection-molded modules installed in outlets of the intake passages.

11. A method for manufacturing a duct system at least one inlet, at least two intake passages having outlets, at least one of said passages having a pivotably mounted flap valve installed therein, a valve driver which produces a switching force, a force transmitting mechanism which couples the flap valves together mechanically and which transmits the switching force from the valve driver to an actuator associated with each flap valve to turn the flap valve such that the flap valve is continuously adjustable to any position between fully open and fully closed, wherein the actuators comprise gear wheels or gear sectors which are fixedly attached to the flap valves, the force transmitting mechanism comprises at least one rack or worm shaft, and a position adjusting mechanism is provided between the force transmitting mechanism and at least two flap valves, said method comprising the following acts:

receiving the flap valves in a jig to bring and hold the flap valves into a desired position relative to each other and to the valve driver;

connecting the force transmitting mechanism to the valve driver and to the actuators;

fixing the adjusting mechanism in position; and thereafter removing the jig.

* * * * *